March 17, 1959
A. POLICH
2,878,033
GOOSENECK DRAWBAR
Filed Oct. 20, 1955
2 Sheets-Sheet 1
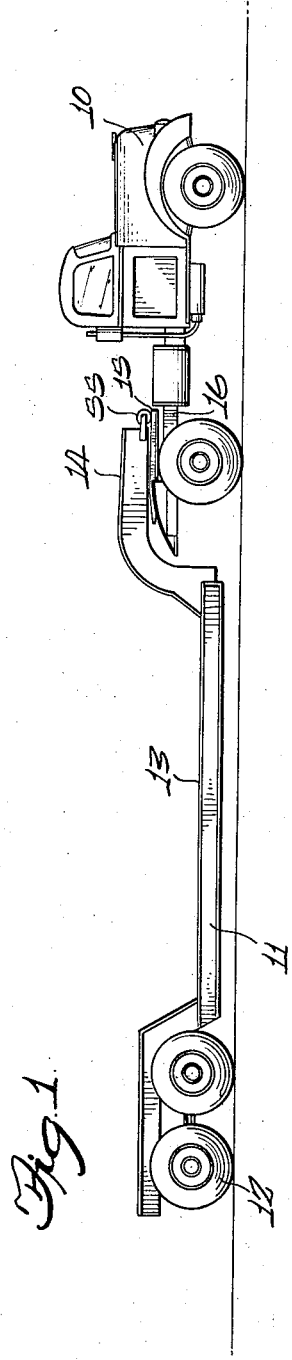
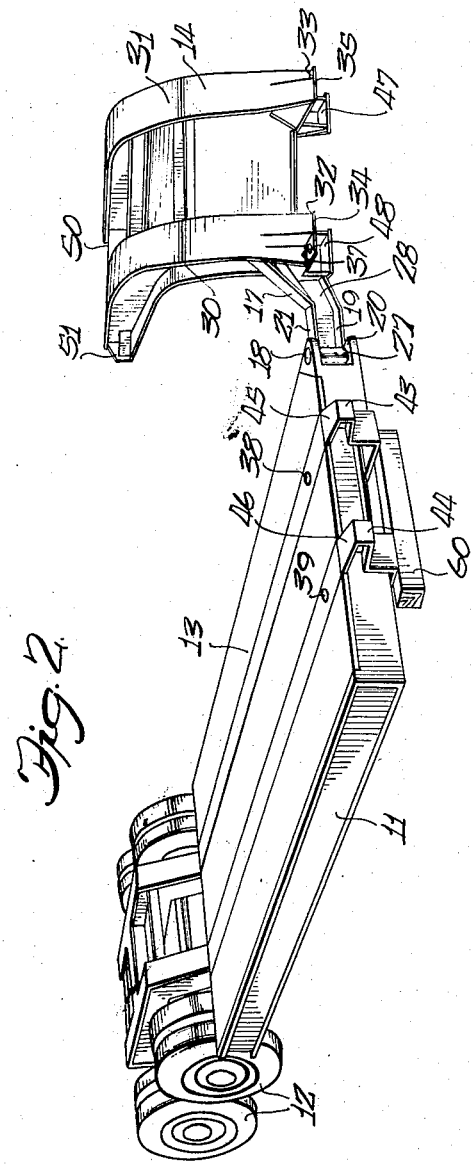
Inventor
Anthony Polich
By: Carlson, Pitzner, Hubbard & Wolfe
Attorneys March 17, 1959  A. POLICH  2,878,033
GOOSENECK DRAWBAR
Filed Oct. 20, 1955
2 Sheets-Sheet 2
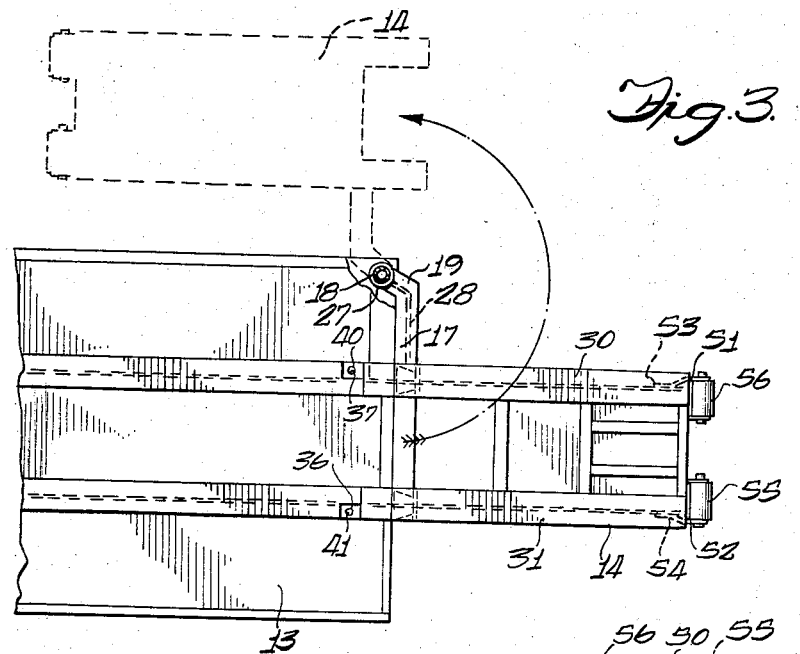
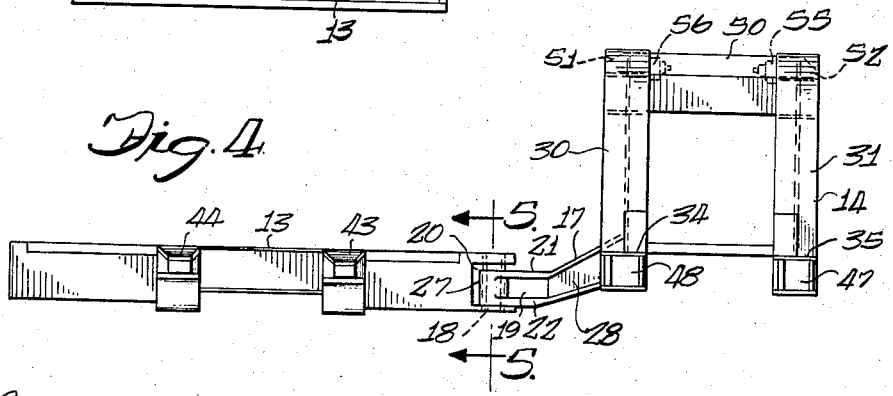
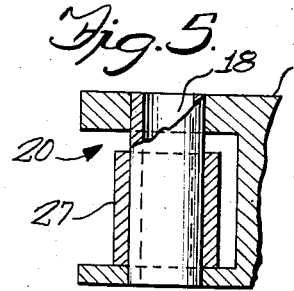
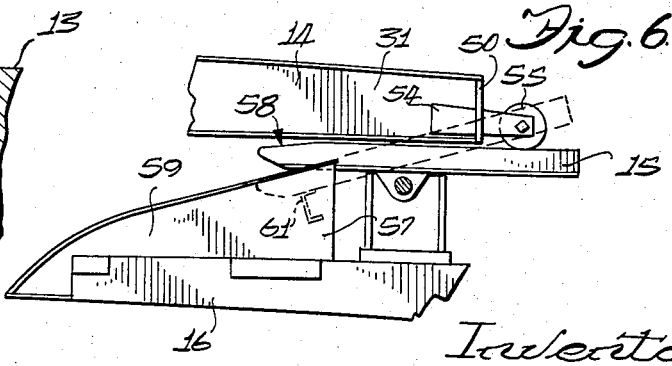
Inventor
Anthony Polich
By: Carlson, Pitzner, Hubbard & Wolfe
Attorneys

United States Patent Office 2,878,033
Patented Mar. 17, 1959

2,878,033

GOOSENECK DRAWBAR

Anthony Polich, Brookfield, Ill., assignor to Sabre Metal Products, Inc., Lyons, Ill., a corporation of Illinois Application October 20, 1955, Serial No. 541,680

4 Claims. (Cl. 280—423)

This invention relates to a coupling for tractor and trailer units and more particularly a gooseneck drawbar.

Low-bed semi-trailers are generally employed for carrying machinery or other heavy freight, and offer the advantage of simplified loading with the bed of the trailer supported at or below axle height only a few feet above the ground. This type trailer may be loaded from the side or over the rear wheels supporting the underslung bed of the vehicle, or from the front. To permit loading from the front however, the conventional gooseneck drawbar which is used to connect the trailer to the tractor must be completely detached and pulled away from the trailer, so as to make the bed of the trailer accessible, and at the same time the front of the trailer must be lowered to rest on a block or other support positioned under the vehicle.

After the fastening elements actually attaching the gooseneck drawbar to the trailer have been removed, the tractor may be drawn slowly away from the trailer, which is roughly dropped into position on the block. To prevent damage to the vehicle and the coupling mechanism, as well as to make the operation safer, additional apparatus may be required to support and guide the heavy front end of the semi-trailer as the gooseneck drawbar is uncoupled, such as a power actuated cable hoist used to winch the front end of the trailer toward the block, as the tractor is drawn away from the semi-trailer. One form of this invention relates to a gooseneck drawbar of the type which may be moved from in front of the trailer to permit front end loading, but which may first be uncoupled from the tractor, making for both easier and safer operation.

It is a principal object of this invention to provide a gooseneck drawbar for coupling a tractor to a bed-type trailer which is pivotally connected to the front of the trailer, allowing the drawbar to swing away from the front of the trailer leaving it unobstructed for front loading.

It is another object to provide means for attaching the free end of the swinging gooseneck drawbar to the semi-trailer, to secure the drawbar automatically in position to be coupled to the fifth wheel of a tractor.

It is a further object to provide a tractor and low-bed semi-trailer coupling system wherein the gooseneck drawbar may be more easily uncoupled and coupled, at the same time permitting the front end of the trailer to be gently lowered and raised to and from a supporting block resting on the ground.

The objects of the invention thus generally set forth together with other objects and ancillary advantages will become apparent from the ensuing description taken in connection with the accompanying drawings in which:

Figure 1 is a view in side elevation of a tractor and low-bed semi-trailer equipped with a gooseneck drawbar constructed according to this invention;

Fig. 2 is a view illustrating the hinged gooseneck drawbar swung away from the front of the low-bed semi-trailer;

Fig. 3 is a top view of the hinged gooseneck drawbar and the front end of the semi-trailer;

Fig. 4 is a view in front elevation of the low-bed semi-trailer with the hinged gooseneck drawbar of this invention swung away toward the side of the trailer;

Fig. 5 is a view in section showing the hinge connection between the semi-trailer and the gooseneck drawbar; and Fig. 6 is a detail view illustrating the construction of the roller with which the hinged gooseneck drawbar is equipped.

A tractor 10 pulling a bed-type trailer, for example a low-bed semi-trailer 11, is illustrated in Fig. 1, the trailer being conventional in construction having wheels 12 supporting the rear of the trailer, the bed 13 of which is underslung and supported between these rear wheels and the tractor 10. A coupling system comprising a gooseneck drawbar 14 and a fifth wheel 15 supported on the tractor is employed to connect the tractor and semi-trailer. The tractor illustrated has a frame 16 supporting the fifth wheel 15 and is also of conventional construction, forming no part of this invention.

The gooseneck drawbar 14 is fastened to the front end of the bed 13 of the trailer by means of a hinge connection, to allow the drawbar to swing away from the front end of the trailer. This hinge connection is formed in an arm 17 connected to one side of the frame member of the gooseneck drawbar 14 and extending to a pin or sleeve 18 supported in a recess in one front corner of the bed 13 of the trailer. The arm 17 is angularly shaped to provide an offset portion 19 (Fig. 3) which extends into the recess 20 formed in the corner of the trailer and may be made of structural steel I beams fashioned with upper and lower flanges 21, 22 which serve to lend additional rigidity and strength to the arm. An I beam construction or a box construction may be used for the arm 17, as desired. For receiving the pin or sleeve 18 on which arm 17 is hinged the offset portion 19 is fastened to a sleeve 27 which forms a bearing as well as a strengthening member surrounding the inner sleeve or pin 18, the sleeve 27 being secured at its upper and lower extremities to the flanges 21, 22 and along one side of the web 28 of the structural member making up the offset portion 19. The arm 17 may be swung on the hinge to locate the drawbar toward one side of the bed of the trailer so as to leave the front end of the trailer unobstructed. With the gooseneck drawbar 14 attached on the front of the trailer, as shown in Fig. 3, the main portion of arm 17 abuts the front end of the trailer with the offset portion 19 extending into the recess 20 in the trailer.

To fasten the drawbar 14 securely to the bed of the trailer, the lower ends of the side frame members 30, 31 are widened to provide overhanging extensions 32, 33 resting on the top of the bed 13 of the trailer. Horizontal flat bearing plates 34, 35 are carried under the lower ends of the side frame members 30, 31 abutting the top surface of the bed 13 of the trailer, these plates having openings 36, 37 registering with openings 38, 39 in the top of the trailer to receive pins 40, 41 for securing the drawbar in place. Before swinging the drawbar away from the front end of the trailer it is necessary to remove both pins 40, 41 which serve to lock the gooseneck drawbar to the bed of the trailer so as to enable the trailer to be coupled to the tractor for hauling. Additional support for the gooseneck drawbar 14 is provided by angle iron lugs 43, 44 projecting from the front end of the bed 13 of the trailer, these lugs having inclined upper surfaces 45, 46 to facilitate sliding the drawbar in place on top of the bed 13 of the trailer. When the drawbar 14 is secured on the front end of the trailer, these lugs 43, 44 nest into cavities 47, 48 formed in the forward portion of the side members 30, 31 by the flanged edges of the angle irons making up these side members.

As previously stated the gooseneck drawbar 14 is adapted to be swung toward one side of the bed of the trailer to leave the front end of the trailer unobstructed so as to facilitate front loading. When the drawbar is coupled to the fifth wheel of a tractor, as illustrated in Fig. 1, the bed 13 of the trailer is supported by the drawbar, which must be uncoupled from the tractor before being detached from the front end of the trailer and swung toward one side out of the way of the loading activities. The gooseneck drawbar has arched side frame members 30, 31 also formed of structural steel beams braced together and extending forwardly to be supported on the fifth wheel of the tractor. The forward ends of the side frame members 30, 31 carry a vertical plate 50 which may be welded or otherwise fastened in place between both side members and extending outwardly of the outer side of each of these members to form triangular projections 51, 52 connected by means of braces 53, 54 to the webs of the side members 30, 31. This plate is provided to support rollers 55, 56 carried at each side in front of and slightly below the forward end of the drawbar 14 which are used when the tractor and drawbar are uncoupled. The fifth wheel 15 on the tractor is conventional in form and may be hinged along a central axis to be tilted toward the rear of the tractor so as to present with the ramp 57 a continuous inclined surface on which the rollers 55, 56 may roll when the tractor is drawn out from under the neck of the drawbar 14. This allows the weight of the trailer to be gradually lowered. As shown in Fig. 6 the ramp 57 comprises inclined members 59 supported on the frame of the trailer and terminating adjacent the ends 58 of the fifth wheel. The fifth wheel is tiltable to the position shown in dotted lines where the upper surfaces of the ramp 57 and the ends 58 of the fifth wheel are contiguous, forming a support for the drawbar 14 during the uncoupling operation, permitting the drawbar 14 to be lowered as the tractor draws away. During this operation, a block 60 is positioned under the front end of the bed of the trailer on the ground, and as the tractor is drawn away from the trailer the bed of the trailer is safely and gently lowered by means of rollers 55, 56 bearing on ramp 57, toward the supporting block 60. As shown in Fig. 2, after the tractor has pulled away from the trailer, the bed of the trailer is supported by the block 60 at its front end while the rear end of the bed of the trailer is supported by the wheels 12.

The fifth wheel, which may be of conventional form, with the curved downwardly extending end portions forming a track for the rollers 55, 56, forms no part of this invention. Such a fifth wheel construction is shown in patent application, Serial No. 477,889, Anthony Polich.

During the coupling operation, the tractor is backed slowly toward the trailer under the neck of the drawbar 14 until the rollers 55, 56 engage the upper inclined surface of the ramp 57. Further rearward movement of the tractor causes the rollers 55, 56 to travel up the ramp 57 toward the fifth wheel 15, raising the forward end of the trailer bed 13 from the block 60. The fifth wheel is tilted toward the rear until the rear portions 58 engage on their underside the brace or stop 61 supported on the ramp members 59, allowing the rollers 55, 56 to pass from the ramp 57 on to the downwardly turned end portions 58 of the rear wheel so that the drawbar 14 may be properly located to be coupled to the fifth wheel 15.

In Figs. 1 and 3 of the drawings, the drawbar 14 is shown connected in such a manner as to support the bed of the trailer for coupling the trailer to a tractor for hauling purposes. The underslung bed 13 of the trailer 11 may then be used to carry machinery or heavy freight on the highway and offers the advantage of simplified loading at the place of origin and unloading at the place of destination.

When either loading or unloading the bed 13 of the trailer, the gooseneck drawbar 14 may be swung as illustrated in Fig. 3 away from the front end of the trailer to allow the operation to be accomplished in a safer and easier manner. The trailer 11 may be loaded from the front thus distinguishing from ordinary low-bed semi-trailers which are loaded from the rear or side, a more difficult operation with bulky heavy freight or machinery. The loading operation can be accomplished, for example, without having to raise the freight over the rear wheels in moving it onto the bed 13 of the trailer. Eliminating this consideration the rear wheels supporting the trailer may be of larger size, increasing the load capacity of the trailer and rendering the vehicle safer for long cross-country hauls.

After the vehicle has reached its destination and the load is to be removed from the bed of the trailer, a block 60 may be positioned under the front end of the trailer to support the load after the tractor has been uncoupled. The trailer may be lowered onto the block 60 by means of rollers 55, 56 travelling the downwardly curved end portions 58 provided by the fifth wheel and the ramp 57, and after resting on the block, the pins 40, 41 attaching the drawbar 14 to the front end of the trailer may be removed so as to permit the drawbar 14 to be swung toward the side and away from the front of the trailer.

The drawbar 14 is supported in an out-of-the-way position toward the side of the trailer by means of arm 17 which permanently connects the drawbar to the trailer itself. With the hinge arrangement of this invention, it is thus unnecessary during periods the vehicle is not used, to store the gooseneck drawbar apart from the vehicle, and it is always conveniently at hand to be quickly attached in place on the front of the trailer.

Important safety features are also present, in that the gooseneck drawbar needs only to be swung away to allow loading and unloading from the front of the trailer eliminating the risk of injuring workmen required to handle a heavy and unwieldy drawbar which has been separated from the front of the trailer while still coupled to the fifth wheel on the tractor, and transported to a garage or other place of storage where it is removed from the tractor.

After the unloading operation, the drawbar 14 may be swung back into position on the front end of the trailer with the inclined surfaces 45, 46 facilitating relocating the drawbar on the top of the bed of the trailer. Pins 40, 41 may then be inserted through the registering openings provided in bearing plates 34, 35 under the side members of the drawbar, and the bed of the trailer, and the tractor backed under the neck of the drawbar to enable the tractor to be coupled to the semi-trailer unit.

Modifications and changes may be made in the form of the invention described without departing from the spirit and scope of the invention as defined in the accompanying claims.

I claim:

1. In a gooseneck drawbar for coupling a tractor to a bed-type trailer having a front end on which said drawbar is mounted and having wheels at the rear end section for carrying the trailer bed, the combination comprising a drawbar frame including a member having a downwardly extending rear portion arranged to lie in abutting relation with the front end of the trailer bed when said drawbar is in position to draw the trailer, and a horizontally extending forward portion defining a neck adapted to be coupled to the tractor, means attached to the front end of said trailer bed and said member pivotally connecting said drawbar frame to said trailer bed, said last-named means including an arm attached at one end to said member so as to extend laterally from said frame and having its free end pivotally connected to the front end of said trailer bed at a point offset laterally from the central axis thereof, the axis of said pivotal connection being vertical so that said drawbar frame swings away from the front end of the trailer bed toward the side thereof, said connection being arranged to permit the drawbar frame to swing beyond the side of said trailer bed to leave the front end unobstructed, to allow loading or unloading over the front end of said trailer bed, and securing devices cooperating with said downwardly extending rear portion of said drawbar frame and said front end of said trailer bed to anchor the drawbar frame thereto in position to draw the trailer.

2. In a gooseneck drawbar for coupling a tractor to a bed-type trailer having a front end on which said drawbar is mounted and having wheels at the rear end section for carrying the trailer bed, the combination comprising a drawbar frame including a pair of spaced members each having a downwardly extending portion arranged to lie in abutting relation with the front end of the trailer bed when said drawbar is in position to draw the trailer, a laterally extending arm attached to one of said side members so as to extend laterally therefrom, a pivotal connection between the free end of said arm and the front end of said trailer bed at a point adjacent one side thereof, the axis of said pivotal connection being vertical so that said drawbar frame swings away from the front end of the trailer bed toward the side of said trailer bed porviding the pivotal support, to allow loading or unloading over the front end of said trailer bed, and securing devices cooperating with said downwardly extending portions of said spaced drawbar frame members and said front end of said trailer bed to anchor the drawbar frame thereto in position to draw the trailer.

3. In a gooseneck drawbar for coupling a tractor to a bed-type trailer having a front end on which said drawbar is mounted and having wheels at the rear end section for carrying the trailer bed, the combination comprising a drawbar frame providing a forwardly extending neck adapted to be releasably coupled to the tractor and a downwardly extending rear portion arranged to lie in abutting relation with the front end of the trailer bed when said drawbar is in position to draw the trailer, an arm attached to said rear portion of said drawbar frame extending laterally in abutting relation with the front end of the trailer bed when the said drawbar frame is secured in position to draw the trailer, said arm having an offset portion adjacent the free end thereof, the front end of said trailer bed adjacent one side having a recess into which said offset portion of said arm extends, a pin passing vertically through said offset portion of said arm and carried by the front end of the trailer bed forming a pivotal connection on a vertical axis for said arm so that said drawbar frame pivots and swings away from the front of said trailer bed toward the side thereof providing the pivotal support, said pivotal connection being arranged to permit the drawbar frame to swing beyond the side of said trailer bed to leave the front end unobstructed, to allow loading or unloading over the front end of the trailer bed, and securing devices for fastening together the front end of said trailer bed and the abutting rear portion of said drawbar frame to hold the drawbar frame to the said trailer bed in position to draw the trailer.

4. A gooseneck drawbar for coupling a tractor to a bed-type trailer having a front end on which said drawbar is mounted and having wheels at the rear end section of the bed for carrying the latter, comprising a drawbar frame providing a forwardly extending neck adapted to be releasably coupled to the tractor and a downwardly extending rear portion arranged to lie in abutting relation with the front end of the trailer bed when said drawbar frame is in position to draw the trailer, an arm connected to said rear section of said drawbar frame so as to extend laterally toward one side edge of the trailer bed, said laterally extending arm being positioned to lie in abutting relation with the front end of the trailer bed when the drawbar is in position to draw the trailer, said arm having an offset portion adjacent the free end thereof, said trailer bed having a recess in the front end adjacent said one side edge into which said offset portion extends, means in said recess providing a pivotal connection for said arm so that said drawbar frame swings away from the front end of the trailer bed toward said one side edge, said connection being arranged to permit the drawbar frame to swing beyond said side edge of said trailer bed leaving the front end of the trailer bed unobstructed for loading or unloading, and means for securing said drawbar frame against the front end of said trailer bed to hold the drawbar frame to the trailer bed in position to draw the trailer.

References Cited in the file of this patent

UNITED STATES PATENTS

| Number | Name | Date |
| --- | --- | --- |
| 2,131,949 | Helmig | Oct. 4, 1938 |
| 2,389,211 | Pointer | Nov. 20, 1945 |
| 2,513,258 | Ulrich | June 27, 1950 |
| 2,611,496 | Martin | Sept. 23, 1952 |
| 2,717,707 | Martin | Sept. 13, 1955 |

FOREIGN PATENTS

| Number | Country | Date |
| --- | --- | --- |
| 760,730 | France | Mar. 1, 1934 |
| 1,076,279 | France | Apr. 21, 1954 |